Figure 1:
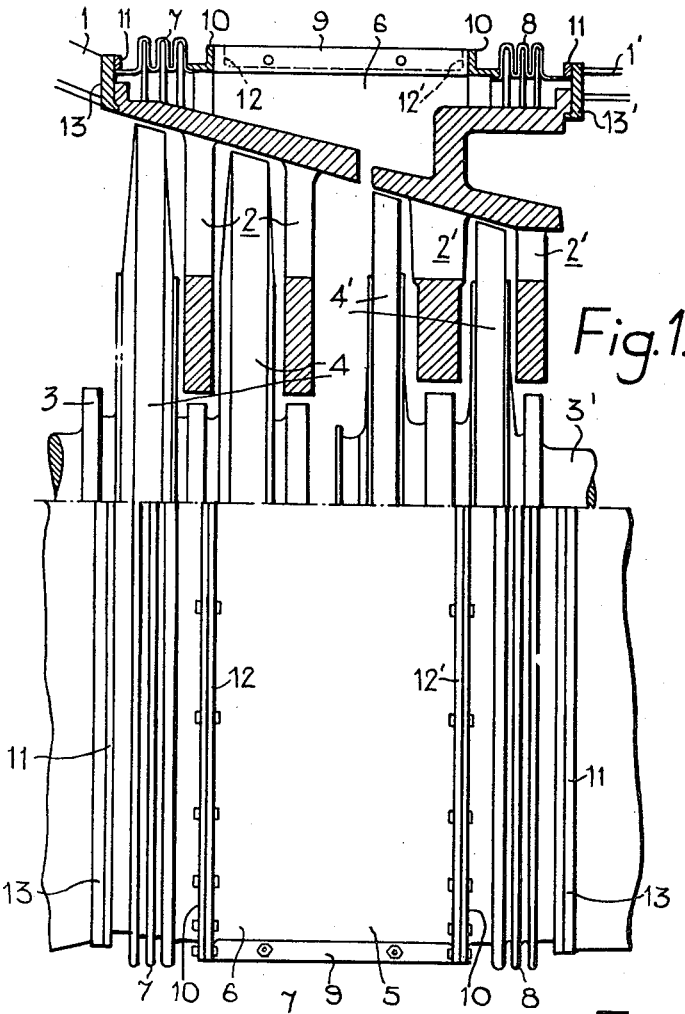

Feb. 16, 1965  F. R. HARRIS  3,169,749
EXPANSION DEVICES FOR TURBINE CASINGS
Filed June 18, 1963

United States Patent Office 3,169,749
Patented Feb. 16, 1965

3,169,749
EXPANSION DEVICES FOR TURBINE CASINGS
Frank Rosslyn Harris, Sale, England, assignor to Associated Electric Industries Limited, London, England, a British company
Filed June 18, 1963, Ser. No. 288,658
Claims priority, application Great Britain, June 20, 1962, 23,781/62
7 Claims. (Cl. 253—39)

This invention relates to an expansion device for use between two casing parts of a turbine plant which are separately mounted and are required to have a degree of relative movement between them.

Whilst the invention may be used on turbine machinery of any kind, it is particularly applicable to a gas turbine of the two-shaft type, where a compressor and two turbines are arranged on a common axis, one of the turbines driving the compressor and the other providing the power output. The two turbines are not mechanically coupled, and rotate independently of one another; for compact installation they are situated axially closely together, and frequently each turbine is over-hung, so that there is no bearing between the two turbines, and the axial length is thereby reduced.

Gas turbines usually require some allowance to be made for thermal expansion, and this sometimes requires the provision in the casing of devices permitting relative movement in the axial direction without leakage of working fluid; such devices may include bellows, convolutions, piston-rings, packed joints, or the like. For constructional reasons such devices must be made continuous in a circumferential direction, i. e. they are circularly complete without any axial joint between parts.

It sometimes happens that such an expansion device is required in the middle of the length of a two-shaft gas turbine; it is apparent that a device without an axial joint results in the inability to lift out a shaft of the machine, without resorting to end-assembly of the expansion device, if the expansion device should lie within or overlap the shaft length. In a two-shaft machine designed for minimum length, where the two shafts are as close together axially as possible, the only possible position for such an expansion device is axially between the two shafts, and the shafts, to be capable of lifting out, must be separated by an axial length at least equal to that of the expansion device; this results in additional length to the machine.

Such end assembly or dismantling involves axial displacement of the machine rotor which is a difficult, awkward and expensive procedure which may well result in damage to the machine. It is thus the principal object of this invention to provide an expansion device particularly suitable for use between casing parts of a two-shaft turbine in a position overlapping adjacent ends of the shafts, which will permit of either shaft being removed transversely from the machine without disturbing the other shaft.

The improved expansion device according to the invention comprises essentially two axially spaced components each permitting relative movement without leakage and interconnected by a tubular spacing piece, said spacing piece being divided axially into at least two parts with sealed joints between them.

In a preferred embodiment, as herein described two axially spaced cylindrical bellows are adapted for connection at their remote ends to parts of a machine casing, and are interconnected at their opposite ends to a tubular spacer which comprises two semi-cylindrical parts bolted together with a sealed joint between them.

Figure 2:
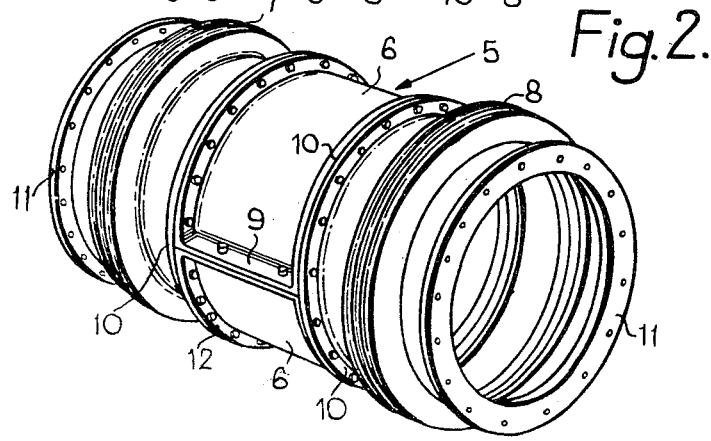

An embodiment of the invention will now be described referring to the accompanying drawings, in which:

FIG. 1 illustrates diagrammatically portions of two turbines arranged coaxially with independently rotatable shafts; and FIG. 2 is a perspective view of an expansion device according to the invention.

Referring first to FIG. 1, each turbine comprises an axially split casing 1 and 1' respectively supporting fixed axially split nozzle diaphragms 2 and 2' and a shaft with bladed rotor discs 4 and 4'. The shafts 3, 3' are supported in bearings (not shown) which they overhang so that there is no bearing between the two machines thus providing a compact installation with the end discs on each shaft close together. Such an arrangement is suitable in a gas turbine plant where a compressor and two turbines are mounted on a common axis, one driving the compressor through shaft 3' and the other, on shaft 3, independently rotating and providing the power output; each of the casings may be supported at various points along the length of the machine allowing the facility of yield or distortion of one or more of the supports and relative movement between the shafts without applying undue strain to the machine casing. The two parts of the casing are connected by an expansion device 5 located at or near the gap between the ends of the two shafts, which in accordance with this invention is so constructed as to permit either rotor to be removed transversely from its position in the machine without disturbing the other.

The expansion device 5 consists of a tubular spacing component made up of two halves 6 secured at each end to a bellows 7, 8 which in turn are mounted on the casings 1.

As shown in FIG. 2 spacing component 6 is divided axially, the two halves being bolted together with a flanged joint 9 with a suitable seal between the flanges. As shown in FIG. 1 the bellows 7 is supported radially on the part carrying the fixed diaphragms 2 and is provided with end flanges 10, 11 for bolting to mating flanges 12, 13 on spacing component 6 and casing part 1 respectively. Similarly bellows 8 is supported radially on the part carrying the fixed diaphragms 2' and is provided with end flanges 10 and 11 for bolting to mating flanges 12' and 13' on spacing component 6 and turbine casing part 1'.

It will be seen that, if for any reason the supports of one turbine should distort so that its shaft is laterally and/or angularly displaced with respect to the shaft of the other turbine, the combination of the two bellows and spacing piece will allow this distortion without undue stress. In addition since the spacing component is split either shaft can be removed without disturbing the other. This is readily accomplished by removing both halves of the spacing component detaching one of the flexible bellows devices 7 or 8 from its mating flanges on the casing and displacing it axially towards the other. By placing both flexible bellows devices 7 and 8 in contact with each other, at one end of the space normally occupied by the flexible bellows plus the spacing component, it is possible to lift out transversely, without interference, the shaft at the other end. For example if it is desired to remove the shaft 3' at the right hand, the flanges 9 and 12 are unbolted and the parts 6 are removed transversely from the machine; the joint 11, 13' of the bellows 8 is then broken and this bellows is moved to the left alongside bellows 7. If desired the abutting flanges 10 can be temporarily bolted to each other. As the shaft 3' is no longer embraced by any bellows it can be removed transversely in the usual manner after removal of the axially split outer casing 1' and axially split diaphragms 2'. When the shaft is replaced, the parts 6 can be restored by reversing the procedure as will be readily understood.

Although in the preferred embodiment as described and illustrated the components 7, 8 are formed as bellows, it will be appreciated that they may be of other leak-proof construction employing piston rings for example, or packed joints of other known form without departing from the scope of the invention. Likewise the spacing component 6 could be divided in more than one axial plane into a number of segments.

In the example above described the turbine rotor wheels are solid with or shrunk on to the respective turbine shafts in which case the wheels 4' and shaft 3' are removed as a whole. It will be understood, however, that in some cases the rotor wheels will be separately bolted to their respective turbine shaft and that, after following the dismantling procedure above described for the spacing component and the bellows, the wheels, for example 4', may then be removed without the shaft 3'.

What I claim is:

1. A gas turbine plant comprising two independently rotatable turbines arranged on a common axis for axial flow of the gaseous medium in series through both turbines, two rotor shafts overhung inwardly with respect to the bearings thereof so that the inward ends of the rotor shafts are axially adjacent each other, an annular casing component surrounding and overlapping both of the overhung ends of the rotor shafts, a resilient expansion joint at each end of said casing component connecting the latter to two separately supported casing parts of the respective turbines, said annular casing component being split in the axial direction into at least two parts for transverse removal normal to the axis and each of the expansion joints being individually releasable for axial displacement into adjacent relationship with the other for allowing access to and transverse removal of parts of the turbines normally contained within the axial length of the annular casing component.

2. A gas turbine plant comprising two independently rotatable turbines arranged on a common axis for axial flow of the gaseous medium in series through both turbines, two rotor shafts overhung inwardly with respect to the bearings thereof so that the rotor shaft ends are axially adjacent each other, an annular casing component sectionally split parallel to the axis and surrounding the blading of each turbine and overlapping both of the overhung ends of the rotor shafts, a resilient expansion joint at each end of said casing component connecting the latter to two separately supported casing parts of the respective turbines, each of the expansion joints being individually releasable for axial displacement into adjacent relationship with the other for allowing access to and transverse removal of parts of the turbines normally contained within the axial length of the annular casing component.

3. A gas turbine plant comprising two independently rotatable turbines arranged on a common axis for axial flow of the gaseous medium in series through both turbines, two rotor shafts overhung inwardly with respect to the bearings thereof so that the rotor shaft ends are axially adjacent each other, an annular casing component sectionally split in the axial direction and surrounding the blading of each turbine and overlapping both of the overhung ends of the rotor shafts, fixed guide blade rings mounted on supports in the region of the overhung rotor shafts respectively, said guide blading also being split in the axial direction, a resilient expansion joint at each end of said casing component connecting the latter to two separately supported casing parts of the respective turbines, said resilient expansion joints having support means for supporting them radially upon the outside of the supports for the fixed guide blade rings but allowing them to move axially under thermal stress, upon the parts connected to them, each of the expansion joints being individually releasable for axial displacement into adjacent relationship with the other for allowing access to and transverse removal of parts of the turbines normally contained within the axial length of the annular casing component.

4. A gas turbine plant comprising two independently rotatable turbines arranged on a common axis for axial flow of the gaseous medium in series through both turbines, two rotor shafts overhung inwardly with respect to the bearings thereof so that the rotor shaft ends are axially adjacent each other, an annular casing component sectionally split in the axial direction and surrounding the blading of each turbine and overlapping both of the overhung ends of the rotor shafts, fixed guide blade rings mounted on supports in the region of the overhung rotor shafts respectively, said guide blading also being split in the axial direction, a resilient expansion joint at each end of said casing component connecting the latter to two separately supported casing parts of the respective turbines, said resilient expansion joints having support means for supporting them radially upon the outside of the supports for the fixed guide blade rings but allowing them to move axially under thermal stress, upon the parts connected to them, each of the expansion joints being individually releasable at each side thereof to allow removal of the casing component and axial displacement of a respective one of said joints into adjacent relationship with the other for allowing access to and transverse removal in succession of said fixed guide blade rings and the turbine rotors.

5. A turbine plant according to claim 1 wherein the overhung rotor shafts carry shrunk-on rotor discs which are solid with the shafts and which are bodily removable with the respective shafts.

6. A turbine plant according to claim 1 wherein the overhung rotor shafts carry rotor wheels separately bolted to the shafts and removable therefrom after removal of the fixed guide blading.

7. A turbine plant according to claim 1 wherein one of the turbines comprises a first expansion stage of the plant driving an axial flow compressor coupled thereto and the other turbine provides the power output.

References Cited by the Examiner

UNITED STATES PATENTS

| | | | |
|---|---|---|---|
| 2,199,595 | 5/40 | Millard | 253—39 |
| 2,711,304 | 6/55 | Mitchell | 253—69 |
| 3,043,559 | 7/59 | Bauer et al. | 253—69 |

JOSEPH H. BRANSON, Jr., *Primary Examiner.*